May 18, 1965     W. H. BARR     3,183,930

CALIBRATED AIR DUCT VALVE

Filed Jan. 2, 1963

*INVENTOR.*
WILLIAM HERSCHEL BARR.

BY Henry H. Snelling

United States Patent Office 3,183,930
Patented May 18, 1965

3,183,930
CALIBRATED AIR DUCT VALVE
William Herschel Barr, 5811 Highland Hills Drive,
Austin, Tex.
Filed Jan. 2, 1963, Ser. No. 249,037
4 Claims. (Cl. 137—610)

This invention relates to air conditioning and has for its principal object the provision of a duct system in which a deflector is calibrated so as to allow the installation mechanic to set the deflector at the job site so it will deliver the desired amount of air to a given area supplied by a branch duct.

Another object of the invention is to provide an insert for easily attaching a branch duct to a trunk or main line duct, the device being particularly advantageous when using the new plastic ducts or when using a modular duct system and particularly when using both the new plastic ducts and the modular duct system. The plastic ducts now in use are about an inch thick and present connection means for them are quite complicated.

A further object of the invention is to provide a device for connecting a branch line to a main air duct which device is easy to install. In installing the valve, a rectangular opening slightly larger than the valve is cut in the trunk line. The valve is inserted in the hole by holding the valve at an angle to the trunk line so that the two flanges on the narrow sides of the valve housing will clear the edges of the opening. The valve is then pulled back so the flanges are moved into contact with the inside surface of the duct. The assembly is then secured in place by attaching two parallel mounting clips to the housing of the valve so that the flanges on the base are held securely against the inside of the main duct. The branch duct may now be placed over the tubular portion of the housing remaining outside of the main duct and the joint between the two ducts may now be sealed either by taping or any other conventional method.

Another advantage of the valve is that a branch duct can be supplied with the desired number of cubic feet per minute of air by setting the deflector of the valve to the position identified for that particular quantity of air, making it unnecessary for the installation worker to depend solely on the adjustment of an outlet register to obtain the proper amount of air to pass through the branch duct. A duct system can be designed easier because the position and size of turning vanes or balanced dampers need not be calculated, since a standard valve for a particular size duct may be used and adjusted for the quantity of air desired. If a minor adjustment is required it may be made by moving the deflector setting.

A still further object of the invention is to provide a device which can be made and installed at low cost. At the present time considerable hours and money are spent in the design and fabrication of dampers, turning vanes and duct sizes to provide the proper amount of air to a branch duct. Calculations for the design of turning vanes are difficult to make, hence in many cases they are designed by trial and error. The present invention eliminates that costly process.

Figure 1:
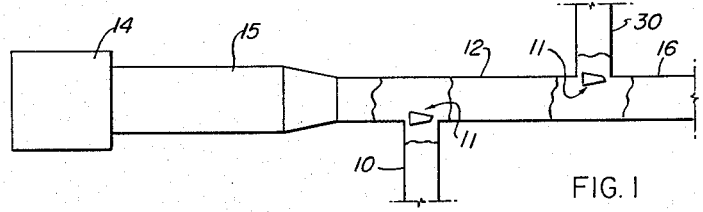
FIGURE 1 is a top plan view of a typical duct system showing the valve of the present invention installed at two branch ducts.

In FIGURE 1 the plenum or air accumulator 14, preferably located above the air conditioning unit (not shown), discharges air under pressure from left to right in the figure, passing from a larger duct 15 to a smaller duct 12, the latter leading to a branch duct 10 at one or more points and finally to a branch duct 30 near the end 16 of the duct. Entry of air into each of the several branch lines is controlled by a calibrated air duct valve assembly 11 each with its deflector pivot 24 so located that the deflector 17 will extend into the main air flow at a chosen angle when open. Except for the final branch duct 30 the air pressure will naturally be greater upstream than downstream. In the branch duct 30 the two pressures will be the same as there would be no air flow there unless its deflector were open.

Figure 2:
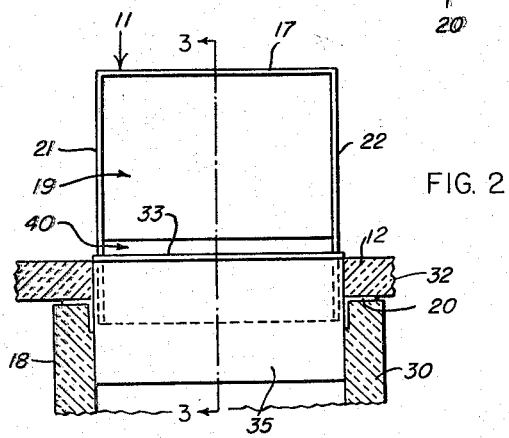
FIGURE 2 is a vertical section of a branch line with the valve installed and looking in the direction of air movement, that is, downstream.

The plane in which FIGURE 2 is taken passes between the edge of the valve assembly within air duct 12 and the inside margin of the branch duct 10 and therefore shows the deflector 17 open and facing the viewer who is looking in the direction of air movement, i.e., downstream. The valve assembly includes a housing 18, the deflector 17 and mounting clips 20, the latter being two angle-shaped pieces of equal flanges and which are attached to the housing 18 only at the time of assembly.

Figure 3:
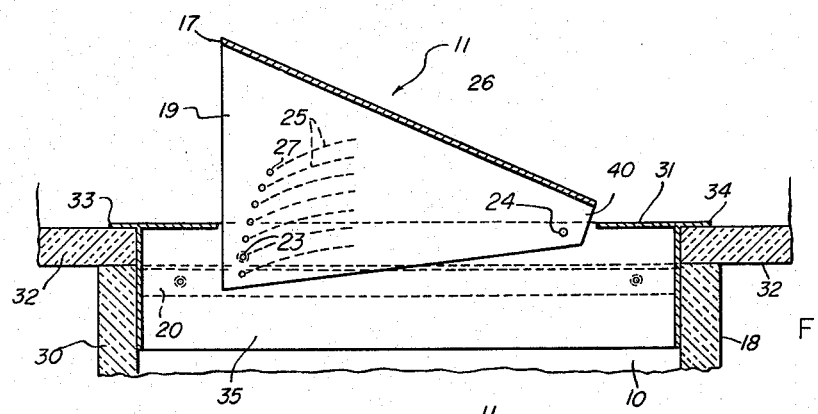
FIGURE 3 is a horizontal section on line 3—3 of FIGURE 2.

The deflector 17 is a wedge-shaped piece including a front opening 19 formed by two parallel horizontal identical sides 21 and 22 connected by an integral central sloping vertical deflecting sheet 26. The deflector has vertical pivots 24 so that the sheet 26 may be moved out into the air stream to meter air into the branch duct and may be located in chosen adjusted position by pins or screws 23 selectively passing through holes 27, corresponding to cubic feet of air passing per minute from the main duct to the branch duct 10. The holes 27 are shown in FIGURE 3 and the dotted lines approaching the holes indicate arcs on the far side of both the top and bottom sheets 21 and 22, the lines 25 indicating volumes usually ranging from 75 to 250 c.f.m. The duplication of marks is necessary as the valve assemblies may be used either side up depending upon the direction of the branch duct.

Figure 4:
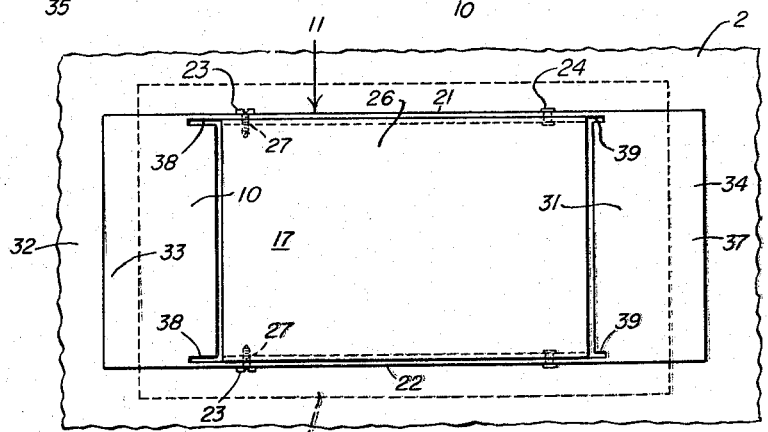
FIGURE 4 is a side view of the valve installed in a duct as viewed from the inside of a trunk duct with the air flowing from left to right.

The housing 18 includes a sheet metal vertical base 31 resting against the wall 32 of the main duct 12 and overlying the same as at 33 and 34 to form flanges on each of the short sides of the housing. The four-sided rectangular tube 35 fast to the base 31 is adapted to receive on opposite sides the angular mounting clips 20 which are secured to the tube at the time of installation with one flange engaging the inside of wall 32 and also the narrow face of branch duct 10, the other flange being secured to the tube. The outline of the inner faces of branch duct 10 is indicated by the dashed line 37 in FIGURE 4. The viewer is looking toward the branch duct but cannot see the same because of the deflector and the base of the housing. It will be noted that small but important slots 38 and 39 are provided in base 31 to receive the parallel sides 21 and 22 of deflector 17. These slots are provided in order to maintain the proper area relationship between the deflector opening and the branch duct. Except for these slots the opening for the deflector would have to be increased upstream and downstream.

The small opening 40 in the rear of the deflector 17 is of considerable importance as in the case of branch duct 30 near the end 16 or in a plenum, the air enters the valve strictly due to pressure in the trunk duct and a larger opening is required than is required when the air is flowing into opening 19 from the left as seen in FIGURE 3. When the air is approaching opening 19 from the left, part of the air passes through opening 19 and a smaller portion enters the branch duct than would enter if opening 40 were closed. One might consider that the total opening into the branch duct is approximately the area of opening 19, minus the area of opening 40.

When the valve is mounted at the end of a trunk duct as at 16 or in a plenum, air enters through openings 19 and 40, so that the area of entry is approximately the sum of areas 19 and 40. Under these conditions, air is flowing almost parallel to the openings 19 and 40 and high entrance losses occur. This causes a larger entrance area to be required. The opening 40 decreases the action of the valve when it is mounted in the side of a duct as at 10 and increases its action when it is mounted at the end of a duct, so that a stock sized valve can be used in either case. The valve is manufactured in several stock sizes and without the action of adding or subtracting the opening 40 from opening 19, a stock size could not be used in many cases. It is realized that for the valve to be calibrated in c.f.m., that a constant pressure or constant velocity must be maintained in the trunk duct or a calibration chart must be used.

With the valve assembly at or near the end of a duct, the direction of air flow is nearly perpendicular to the surface 26 of the deflector and air is flowing from a direction corresponding to the top of the drawing as viewed in FIGURE 3. The amount of air delivered to the branch duct 30 can be adjusted as described above, but since the air is being forced into the branch duct 30 because of high entry co-efficients, a larger opening is usually required and part of the air will enter through opening 40 as well as through opening 19. In this case opening 40 adds to the total area of entry instead of subtracting from it, so that the calibration markings will still be correct.

What I claim is:

1. An insert for use in an air conditioning system having a main plastic air duct, a branch plastic air duct leading therefrom at 90°, comprising a housing having a vertical base with a four-sided tube secured thereto and snugly fitting the interior of the branch duct and flanges overlying the wall of the main duct on two sides, a three-sided deflector pivoted to the tube to move outward into the main duct, means for locking the deflector in chosen calibrated position, and an angled clip mounting on each of two opposite sides of the tube, one flange of each clip being secured to the tube and the other flange is located between the wall of the main duct and the wall of the branch duct, whereby the two angled mounting clips may be secured to the tubes at the time of installation and the branch duct may then be put in place to surround the tube.

2. The insert of claim 1 in which the deflector includes two flat horizontal sides and a sloping vertical sheet.

3. The insert of claim 2 in which the pivot of the deflector is located so that there is a full width opening at the downstream side of the deflector.

4. The insert of claim 1 in which the vertical base is slotted both front and back to receive the sides of the deflector, and thus minimizing the size of the opening in the vertical base.

References Cited by the Examiner
UNITED STATES PATENTS

| | | | |
|---|---|---|---|
| 1,062,352 | 5/13 | Middleton | 302—27 |
| 1,652,916 | 12/27 | Trottier | 251—90 XR |
| 2,667,185 | 1/54 | Beavers | 138—37 |
| 2,774,554 | 12/56 | Ashwood | 137—610 XR |
| 3,105,520 | 10/63 | Lorrett | 138—39 |

FOREIGN PATENTS

| | | |
|---|---|---|
| 469,364 | 12/28 | Germany. |
| 856,127 | 12/60 | Great Britain. |

ISADOR WEIL, *Primary Examiner.*

WILLIAM F. O'DEA, *Examiner.*